United States Patent
Dodrill et al.

(10) Patent No.: US 7,555,536 B2
(45) Date of Patent: Jun. 30, 2009

(54) APPARATUS AND METHODS FOR PROVIDING AN AUDIBLY CONTROLLED USER INTERFACE FOR AUDIO-BASED COMMUNICATION DEVICES

(75) Inventors: Lewis D. Dodrill, Richmond, VA (US); Ryan A. Danner, Glen Allen, VA (US); Steven J. Martin, Richmond, VA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 11/873,619

(22) Filed: Oct. 17, 2007

(65) Prior Publication Data
US 2008/0034035 A1 Feb. 7, 2008

Related U.S. Application Data

(62) Division of application No. 09/608,232, filed on Jun. 30, 2000, now Pat. No. 7,308,484.

(51) Int. Cl.
*G06F 15/16* (2006.01)
(52) U.S. Cl. .................. 709/218; 707/512; 707/530; 707/531; 379/88.22; 379/67; 379/88
(58) Field of Classification Search .......... 709/230, 709/218; 707/512, 530, 531; 379/88.22, 379/67, 88
See application file for complete search history.

(56) References Cited

U.S. PATENT DOCUMENTS

| | | | |
|---|---|---|---|
| 5,915,001 A * | 6/1999 | Uppaluru ............. | 379/88.22 |
| 5,922,047 A | 7/1999 | Newlin et al. | |
| 5,936,527 A | 8/1999 | Isaacman et al. | |
| 6,108,410 A | 8/2000 | Reding et al. | |
| 6,108,629 A | 8/2000 | Kasday | |
| 6,125,376 A | 9/2000 | Klarlund et al. | |
| 6,144,937 A * | 11/2000 | Ali ...................... | 704/233 |
| 6,243,722 B1 * | 6/2001 | Day et al. ............. | 715/205 |
| 6,314,402 B1 | 11/2001 | Monaco et al. | |
| 6,324,507 B1 | 11/2001 | Lewis et al. | |
| 6,347,299 B1 | 2/2002 | Holzman et al. | |
| 6,507,837 B1 * | 1/2003 | De La Huerga ........... | 707/3 |
| 6,587,822 B2 | 7/2003 | Brown et al. | |
| 6,636,831 B1 * | 10/2003 | Profit et al. ............ | 704/275 |
| 6,658,389 B1 | 12/2003 | Alpdemir | |
| 6,671,853 B1 * | 12/2003 | Burkett et al. .......... | 715/235 |
| 6,862,732 B1 * | 3/2005 | Schultz et al. .......... | 718/102 |

(Continued)

*Primary Examiner*—Thanh Tammy Nguyen
(74) *Attorney, Agent, or Firm*—BainwoodHuang

(57) ABSTRACT

The invention is directed to techniques for providing an audibly controlled interface for a user of a limited audio-based communication device, for example, a telephony device such as a desktop telephone or a cellular telephone. The communication device has an interface connection with a proxy browser. The user initially accesses the device, such as by picking up the handset, and the proxy browser provides a communication path over a network to a call services application on an application server. The application server provides a response to the initial access signal. The proxy browser receives the response from the application server and plays back an audio output based on the response to the communication device for the user. The user can then respond with a request to the call services application to place an outbound call or to initiate another service provided by the application server via the proxy browser.

17 Claims, 8 Drawing Sheets

U.S. PATENT DOCUMENTS 6,886,130 B1  4/2005  Unger et al.
7,216,351 B1 *  5/2007  Maes ......................... 719/328
2002/0112175 A1 *  8/2002  Makofka et al. ............ 713/200

* cited by examiner

```
                    <XML version="1.0">
101——<PLUGIN CONTROL>
     102——<PROMPTLIST type="wav"  prefetch="true">
          104——<PROMPT> wav1.wav</PROMPT>
          106——<PROMPT>wav2.wav</PROMPT>
               <PROMPTLIST/>
     110——<USERINPUT>
          112——<HOTKEY_PATTERN VALUE = "(*[0-9])"/>
               <MAXLENGTH> 10 </MAXLENGTH>
          </USERINPUT>
     </PLUGIN_CONTROL>
```

FIG. 4A

```
108——<PROMPT name = "wav1.wav">
```

FIG. 4B

APPARATUS AND METHODS FOR PROVIDING AN AUDIBLY CONTROLLED USER INTERFACE FOR AUDIO-BASED COMMUNICATION DEVICES

CROSS REFERENCE TO RELATED APPLICATIONS

This Patent Application claims the benefit under 35 U.S.C. § 120 of U.S. application Ser. No. 09/608,232 filed Jun. 30, 2000 the contents and teachings of which are hereby incorporated by reference in their entirety.

BACKGROUND

The evolution of the conventional public switched telephone network has resulted in a variety of voice applications and services that can be provided to individual subscribers and business subscribers. Such services include voice messaging systems that enable landline or wireless subscribers to record, playback, and forward voice mail messages. However, the ability to provide enhanced services to subscribers of the public switched telephone network is directly affected by the limitations of the public switched telephone network. In particular, the public switched telephone network operates according to a protocol that is specifically designed for the transport of voice signals; hence any modifications necessary to provide enhanced services can only be done by switch vendors that have sufficient know-how of the existing public switched telephone network infrastructure.

An open standards-based Internet protocol (IP) network, such as the World Wide Web, the Internet, or a corporate intranet, provides client-server type application services for clients by enabling the clients to request application services from remote servers using standardized protocols, for example, the hypertext transport protocol (HTTP). The web server application environment can include web server software, such as Apache, implemented on a computer system attached to the IP network. Web-based applications are composed of HTML (Hypertext Markup Language) pages, logic, and database functions. In addition, the web server may provide logging and monitoring capabilities.

In contrast to the public switched telephone network, the open standards-based IP network has enabled the proliferation of web based applications written by web application developers using web development tools. Hence, the ever increasing popularity of conventional web applications and web development tools provides substantial resources for application developers to develop robust web applications in a relatively short time and in an economical manner. However, one important distinction between telephony-based applications and web-based applications is that telephony-based applications are state aware, whereas web-based applications are stateless.

In particular, conventional telephony applications are state aware to ensure that prescribed operations between the telephony application servers and the user telephony devices occur in a prescribed sequence. For example, operations such as call processing operations, voicemail operations, call forwarding, etc., require that specific actions occur in a specific sequence to enable the multiple components of the public switched telephone network to complete the prescribed operations.

The prior art web-based applications running in the IP network, however, are state-less and transient in nature, and do not maintain application state because application state requires an interactive communication between the browser and back-end database servers accessed by the browsers via a HTTP-based web server. However, an HTTP server provides asynchronous execution of HTML applications, where the web applications in response to reception of a specific request in the form of a URL (Uniform Resource Locator) from a client, instantiate a program configured for execution of the specific request, send an HTML web page back to the client, and terminate the program instance that executed the specific request. Storage of application state information in the form of a "cookie" is not practical because some users prefer not to enable cookies on their browser, and because the passing of a large amount of state information as would normally be required for voice-type applications between the browser and the web application would substantially reduce the bandwidth available for the client.

In reference to a conventional telephony-based application (unlike those in the patent applications incorporated by reference above), a user can use the application to access prerecorded responses from a remote source by using audio prompts. This prior art interface may be based on simple predefined voice commands, like "yes" or "no," or reciting a number to select an option. The interface may also be based on entering numbered or other responses on a touch tone keypad into the telephone. For example, a user can use a touch tone telephone to access a bank and obtain the balance or other information on a bank account over a telephone. A user can also use a touch tone telephone to obtain information about some topic or organization they are interested in, such as the hours, exhibits, prices, and special events for a museum, based on a menu of prerecorded prompts and messages maintained by the museum.

In general, in conventional techniques, automated speech recognition techniques (ASR) executing on a processor or computer provide for the recognition of words or phrases in a user's speech. Typically, when sitting at a computer, a user can provide speech input into a microphone attached to a computer, and the computer can translate words and phrases in the speech into commands or data that the computer receives as input similar to the way input typed into a keyboard would be used by a computer. Text to speech (TTS) techniques provide for the output of a computer or database to be translated from text or data output to speech.

In one conventional approach, a telephone can use a WAP (wireless application protocol) to access data at a remote location from the WAP telephone. The protocol includes a WML (wireless markup language) used with a script language to program the WAP telephone.

SUMMARY

The following paragraphs summarize related applications suitable for use in implementing the invention.

Commonly-assigned, copending application Ser. No. 09/480,485, filed Jan. 11, 2000, entitled "Application Server Configured for Dynamically Generating Web Pages for Voice Enabled Web Applications", the disclosure of which is incorporated in its entirety herein by reference, discloses an application server that executes a voice-enabled web application by runtime execution of extensible markup language (XML) documents that define the voice-enabled web application to be executed. The application server includes a runtime environment that establishes an efficient, high-speed connection to a web server. The application server, in response to receiving a user request from a user, accesses an XML page that defines at least a part of the voice application to be executed for the user. The XML page may describe a user interface, such as dynamic generation of a menu of options or a prompt for a password, an application logic operation, or a function capability such as generating a function call to an external resource. The application server then parses the XML page, and executes the operation described by the XML page, for example, by dynamically generating an HTML page having voice application control content, or fetching another XML page to continue application processing. In addition, the application server may access an XML page that stores application state information, enabling the application server to be state-aware relative to the user interaction. Hence, the XML page, which can be written using a conventional editor or word processor, defines the application to be executed by the application server within the runtime environment, enabling voice enabled web applications to be generated and executed without the necessity of programming language environments. Hence, web programmers can write voice-enabled web applications, using the teachings of the above-incorporated application Ser. No. 09/480,485, by writing XML pages that specify respective voice application operations to be performed. The XML documents have a distinct feature of having tags that allow a web browser (or other software) to identify information as being a specific kind or type of information.

Commonly assigned, copending application Ser. No. 09/501,516, filed Feb. 1, 2000, entitled "Arrangement for Defining and Processing Voice Enabled Web Applications Using Extensible Markup Language Documents", the disclosure of which is incorporated in its entirety herein by reference, discloses an arrangement for defining a voice-enabled web application using extensible markup language (XML) documents that define the voice application operations to be performed within the voice application. Each voice application operation can be defined as any one of a user interface operation, a logic operation, or a function operation. Each XML document includes XML tags that specify the user interface operation, the logic operation and/or the function operation to be performed within a corresponding voice application operation, the XML tags being based on prescribed rule sets that specify the executable functions to be performed by the application runtime environment. Each XML document may also reference another XML document to be executed based on the relative position of the XML document within the sequence of voice application operations to be performed. The XML documents are stored for execution of the voice application by an application server in an application runtime environment. Hence, the XML document described in the above-incorporated application Ser. No. 09/501,516, which can be written using a conventional editor or word processor, defines the application to be executed by the application server within the runtime environment, enabling voice enabled web applications to be generated and executed without the necessity of programming language environments.

Commonly-assigned, copending application Ser. No. 09/459,927, filed Dec. 14, 1999, entitled "Proxy Browser Providing Voice Enabled Web Application Audio Control for Telephony Devices", the disclosure of which is incorporated in its entirety herein by reference, discloses an arrangement for providing voice application control between a web browser acting as a proxy browser, and an application server via a hypertext transport protocol (HTTP) connection on an Internet Protocol (IP) network. The web browser receives an HTML page having an XML element that defines data for an audio operation to be performed by an executable audio resource. If the web browser does not have the executable audio resource, then the web browser ignores the XML element, and merely presents any other recognized HTML tags. However if the web browser has access to an executable audio resource that understands the XML element, then the web browser executes the audio operation based on enhanced audio control specified by the XML element. Hence, a web browser, as described in the above-incorporated application Ser. No. 09/459,927, can be used to provide enhanced voice control for voice enabled web applications, merely by possession of an executable audio resource that recognizes the XML element that specifies the enhanced audio control required for the audio operation to be performed. In addition, the web browser provides voice services for user devices that lack application control functionality by acting as a proxy browser for the user devices. In particular, the proxy browser is executable within an interface between a public switched telephone network component and the IP network. The proxy web browser, based on capabilities information for a corresponding user device, is configured for selectively ignoring received HTML tags that specify media content to be displayed, and selectively executing the audio operations specified by the XML element. Hence, the proxy browser supplies to a user device only the content that the user device is capable of interpreting, for example audio signals for an analog telephone, or text for a pager or a facsimile machine.

The present invention is directed to an improved approach for providing an audibly controlled user interface for a user of a telephone or other audio communication device. There are a number of deficiencies with the user interfaces for conventional voice-based communications systems. For example, when a user accesses an audio prompt-based system using a conventional telephone, the user is typically limited to the same predesigned prompts provided by a telephone service provider to all users. In some cases, the user can configure the types of information received via prompts, but cannot typically customize the prompts with personalized commands. For example, suppose that a user is accessing a long distance carrier from a telephone. The user must dial into the long distance carrier and is limited to hearing predesigned prompts from the long distance carrier, and the user must enter the outbound telephone number that he/she wishes to dial. The user may desire to have immediate or ready access to an audio menu provided over the user's personal telephone without having to dial in to a service provider. After initial access to a service providing interactive responses and menus, the user may wish to make specific requests and/or select specific options from a menu and receive appropriate individualized responses. For example, the user may wish to customize a personalized menu to be able to readily call an individual, or add personalized commands to the menu. Prior art systems generally do not provide such features.

The techniques of the present invention address the above deficiencies by providing an audibly controlled interactive interface for the user of a telephone. The user can pick up their telephone or access the cellular phone and immediately access a personalized audio menu played over the telephone or enter speech input, such as "Call Bob," which is interpreted by ASR (automated speech recognition) software to provide a command to call the person indicated. The command is passed to a call services application that can initiate the outgoing call to the person indicated or initiate some other call service, such as accessing voice mail, accessing electronic mail, or providing other services.

The telephone, or other audio communication device, is not required to have a microprocessor, specialized electronics, or understand a specific markup language protocol, such as WAP. The audio response or menu is provided from a proxy browser. The proxy browser manages the input from the user, interprets the input with ASR software, and passes on the input and/or request to an audio application program that provides a response or menu that the proxy browser then plays to the user of the telephone. The invention does not require the proxy browser to be a bulky or complex application, and the audio application provides a variety of menus and responses, including user customizable responses and commands, along with access to databases or stored information, such as favored telephone numbers, for the user. Thus the user can hear a personalized menu, including, for example, options to call a favored number often called by the user. Thus the user, can quickly select an option indicating a person to be called. The user can also customize the menu by audibly selecting an option to do so, or entering a command, such as "Add Bob to call list". For example, the audibly controlled interface, according to one embodiment of the invention, can respond by completing the request, if Bob's phone number is already in a database, or query the user for the phone number.

Conventional wireless telephones providing menu services, such as telephones based on a WAP protocol, typically require the telephone to include electronic circuitry or a computer processor programmed to recognize a specialized protocol, such as the WAP protocol. Typically, this type of WAP access is closely integrated with a particular telephone service provider. Conversely, the techniques of the present invention do not require the telephone, or other audio communication device, to be designed or programmed for a specific data protocol, other than the conventional telephony protocols for that type of audio communication device. That is, the techniques of the invention do not require the user's telephone to be designed or programmed for the WAP protocol. This approach allows any type of conventional telephone to use the system of the invention to access, for example, voice mail, electronic mail, sites on the web, etc.

In one embodiment, the invention is directed to a method in a browser for providing an audibly controlled user interface for a limited communication device. The method includes the steps of receiving speech input information over an interface connection capable of two-way communication with the limited communication device, generating at least one key chunk of information based on the speech input information, generating an audio output developed from a response document based on the at least one key chunk of information, and providing the audio output over the interface connection to the limited communication device in response to generating the audio output. For example, using the invention, the user can speak a command, such as "Call Bob," or select a menu option to place an outgoing call or perform some other action, such as checking voice mail.

In another embodiment, the method includes providing one or more key chunks of information to a web application, such as a call services application, and receiving the response document from the web application, the response document developed from an application-defining document accessed in response to the one or more key chunks of information provided to the web application. A key chunk is generally a recognized command or instruction provided by the user within a verbal stream of input.

The method, in one embodiment, includes receiving the speech input information over a telephony connection to the limited communication device, and providing the audio output over the telephony connection.

In another embodiment, the method includes generating one or more key chunks of information by an automatic speech recognition module that derives the one or more key chunks of information from the speech input information.

In a further embodiment, the method includes receiving an input indicating an initial access to the limited communication device. Such an input may be a provided by the user lifting the handset of a telephone or speaking a command at a dial-tone to invoke the method of the invention.

The method includes, in one embodiment, receiving one or more commands for storing data, retrieving data, and/or placing an outbound telephony call.

In one embodiment, the invention is directed to a processor-based system for providing an audibly controlled interface for a limited communication device, including an interface connection capable of two-way communication with the limited communication device, and a proxy browser in communication with the interface connection. The interface connection receives speech input information and provides the speech input information to the proxy browser. The proxy browser generates one or more key chunks of information based on the speech input information. The proxy browser generates an audio output developed from a response document based on the one or more key chunks of information and provides the audio output to the interface connection, which provides the audio output to the limited communication device. Thus, the user hears an audio response on his/her telephone through the interface connection between the telephone and the proxy browser.

In another embodiment, the proxy browser provides one or more key chunks of information to a web application over a network, and receives a response document over the network from the web application. The response document is developed from an application-defining document accessed in response to the one or more key chunks of information provided to the web application. In a further embodiment, the interface connection is a telephony connection.

The system of the invention, in one embodiment, further comprises an automatic speech recognition module. The automatic speech recognition module derives one or more key chunks of information from the speech input information received over the interface connection.

In another embodiment, the speech input information includes an input indicating an initial access to the limited communication device. The user may provide the initial access by lifting the handset of a telephone or speaking a command at a dial-tone to invoke the system of the invention.

In a further embodiment, the speech input information includes one or more commands for storing data, retrieving data, and/or placing an outbound telephony call. For example, the user can request that a new name and telephone number be stored in a database for future use.

In one embodiment, the invention is directed to a processor-based system for providing an audibly controlled interface for a limited communication device, including an interface connection capable of two-way communication with the limited communication device, and means for generating an audio output, the generating means in communication with the interface connection. The interface connection receives speech input information and provides the speech input information to the generating means. The generating means generates one or more key chunks of information based on the speech input information, and generates an audio output developed from a response document based on the one or more key chunks of information and provides the audio output to the interface connection. The interface connection provides the audio output to the limited communication device.

In another embodiment, the invention is directed to a computer program product that includes a computer readable medium having instructions stored thereon for providing an audibly controlled interface for a limited communication device. The instructions, when carried out by a computer, cause the computer to perform any or all of the operations disclosed herein of the invention. For example, in one embodiment, the instructions cause the computer to receive speech input information over an interface connection capable of two-way communication with the limited communication device, to generate one or more key chunks of information based on the speech input information, to generate an audio output developed from a response document based on one or more key chunks of information, and to provide the audio output over the interface connection to the limited communication device in response to generating the audio output.

In a further embodiment of the invention, a computer program propagated signal product is embodied in a propagated medium, having instructions for providing an audibly controlled interface for a limited communication. The instructions, when carried out by a computer, cause the computer to perform any or all of the operations disclosed herein of the invention.

In one embodiment, the invention is directed to a method in a server for providing an audibly controlled user interface for requesting call services over a network. The method includes the steps of accessing an application defining tagged document in response to a request received over the network, providing a response suitable for audio output based on the application defining tagged document and the request, receiving one or more key chunks of information over the network based on speech input information based on the response, and initiating a call service in response to receiving one or more key chunks of information.

In another embodiment, the method includes accessing an extensible markup language document, and generating the response based on the extensible markup language document. In one embodiment, the method includes receiving an input indicating an initial access to a limited communication device. The method includes, in another embodiment, receiving the request from a proxy browser based on an interface connection between the proxy browser and a limited communication device.

In another embodiment, the method includes providing a modified application defining tagged document based on dynamically changing modifiable responses in the application defining tagged document in response to the request. In a further embodiment, the method includes receiving a modification input and providing a modified application defining tagged document based on dynamically changing modifiable responses in the application defining tagged document based on the modification input. Thus, the user can modify a response or a menu by providing additional information, such as names of people they frequently call, or add other individualized commands and options to the menu. The user can modify the response dynamically, that is, based on his/her own request for an immediate modification without the intervention of a system administrator or expert user provided by a telephone service provider or other organization.

In one embodiment, the invention is directed to a processor-based system for providing an audibly controlled interface over a network, including a document database configured for storing a plurality of application defining tagged documents, and an executable resource in communication with the document database and the network. The executable resource accesses an application defining tagged document in response to a request received over the network, provides a response suitable for audio output based on the application defining tagged document and the request, receives one or more key chunks of information over the network based on speech input information based on the response, and initiates a call service in response to receiving one or more key chunks of information.

In another embodiment, the application defining tagged document is an extensible markup language document, and the executable resource generates the response based on the extensible markup language document. In a further embodiment, the request includes an input indicating an initial access to a limited communication device.

In an additional embodiment, the executable resource receives the request from a proxy browser based on an interface connection between the proxy browser and a limited communication device.

In another embodiment, the executable resource dynamically changes modifiable responses in the application defining tagged document in response to the request to provide a modified application defining tagged document. In a further embodiment, the executable resource receives a modification input, and the executable resource dynamically changes modifiable responses in the tagged document in response to the modification input to provide a modified tagged document.

In one embodiment, the invention is directed to a processor-based system for providing an audibly controlled interface over a network, including a document database configured for storing a plurality of application defining tagged documents, and means for producing a response suitable for audio output, the producing means in communication with the document database and the network. The producing means accesses an application defining tagged document in response to a request received over the network, provides a response suitable for audio output based on the application defining tagged document and the request, receives one or more key chunks of information over the network based on speech input information based on the response, and initiates a call service in response to receiving one or more key chunks of information.

In a further embodiment, the invention is directed to a computer program product that includes a computer readable medium having instructions stored thereon for providing an audibly controlled interface over a network. The instructions, when carried out by a computer, cause the computer to perform any or all of the operations disclosed herein of the invention. For example, the instructions cause the computer to access an application defining tagged document in response to request received over the network, provide a response suitable for audio output based on the application defining tagged document and the request, receive one or more one key chunks of information over the network based on speech input information based on the response, and initiate a call service in response to receiving one or more key chunks of information.

In one embodiment, the invention is directed to a method in a browser for providing an audibly controlled user interface for requesting call services, including the steps of receiving input information indicating an initial access to a limited communication device over an interface connection capable of two-way communication with the limited communication device, providing a first request to a web application based on the input information, providing audio output over the interface connection to the limited communication device based on a response document received from the web application in response to providing the first request, and providing a second request that specifies a call service to the web application in response to generating one or more key chunks of information based on speech information received over the interface connection in response to providing the audio output.

In one embodiment, the invention is directed to method in an application server. The method includes receiving a first request over a network for a response for a subscriber, accessing profile information for the subscriber from a database, generating a response document having content tags that specify media content and control tags that define playback of the response for the subscriber in an audible form, receiving a second request over the network including one or more key chunks generated based on a speech command provided by the subscriber based on the response document, and initiating a call service based on interpretation of the one or more key chunks relative to the profile information and the response.

In another embodiment, the method includes receiving a first request comprises receiving a first hypertext transfer protocol (HTTP) request, accessing profile information from the database based on Internet Protocol (IP), generating a hypertext markup language (HTML) document having extensible markup language (XML) tags, and receiving a second HTTP request.

In a further embodiment, the method includes initiating an outgoing call to a destination based on interpretation of one or more key chunks relative to the profile information and the first response.

In some embodiments, the techniques of the invention are implemented primarily by computer software. The computer program logic embodiments, which are essentially software, when executed on one or more hardware processors in one or more hardware computing systems cause the processors to perform the techniques outlined above. In other words, these embodiments of the invention are generally manufactured as a computer program stored on a disk, memory, card, or other such media that can be loaded directly into a computer, or downloaded over a network into a computer, to make the device perform according to the operations of the invention. In one embodiment, the techniques of the invention are implemented in hardware circuitry, such as an integrated circuit (IC) or application specific integrated circuit (ASIC).

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

FIGS. 4A and 4B are diagrams illustrating extensible markup language (XML) expressions usable for implementations of voice application on the IP network.

DETAILED DESCRIPTION

The invention is directed to techniques for providing an audibly controlled interface for a user of a limited audio-based communication device, for example, a telephony device such as a desktop telephone or a cellular telephone. The communication device is in communication through an interface connection or device interface with a browser, such as a proxy browser, which is in communication with an application server over a network. The user initially accesses the device, such as by picking up the handset, or otherwise indicates a desire to access a call services application on the application server, such as by dialing a number providing access to the a call services application. The proxy browser provides a communication path over a network to the call services application. The application server accesses an application defining document (e.g. XML menu/decision document) which the application server uses to provide a menu-based or other response to the initial access signal. The proxy browser receives the response from the application server and plays back an audio output from the response to the user. The user can then respond with a request for the application server to initiate an outbound call or to initiate another service (e.g. check voice mail) provided by the call services application server via the proxy browser.

FIGS. 1 through 5 are diagrams illustrating an example of the environment in which the invention can be implemented.

Figure 1:
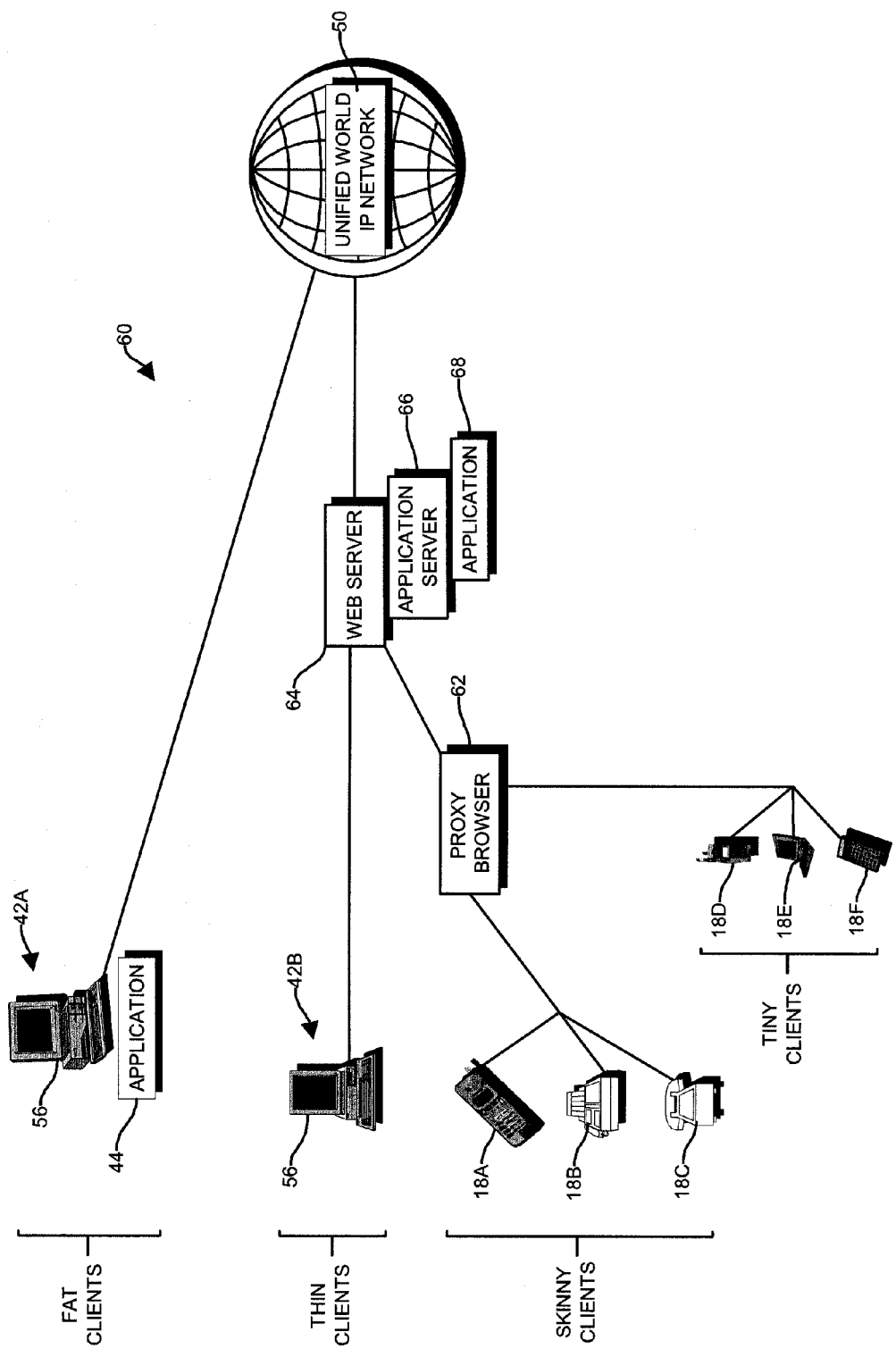
FIG. 1 is a block diagram illustrating a paradigm that enables unified voice messaging services and data services to be provided via an IP network using browser audio control according to an embodiment of the present invention.

FIG. 1 is a block diagram illustrating a unified communications architecture 60 that provides unified voice messaging services and data services via an IP network using browser audio control according to an embodiment of the present invention, based on FIG. 1 of the above-incorporated application Ser. No. 09/501,516. FIG. 1 illustrates clients 42 (shown individually as 42a and 42b), a unified world IP (Internet Protocol) network 50, skinny and tiny clients 18 (shown individually as skinny clients 18a, 18b, and 18c, and tiny clients 18d, 18e, and 18f), proxy browser 62, web server 64, application server 66, and application environment 68. The fat client 42a includes a browser 56 and a local application 44 running on the fat client 42a and providing services to the fat client 42a. The fat client 42b includes a browser 56.

The clients 42a and 42b, referred to herein as "fat clients" and "thin clients", respectively, have the distinct advantage that they can initiate requests using IP protocol to any connected web server 64 to execute part or most of the applications 44 on behalf of the clients. An example of a fat client 42a is an e-mail application on a PC that knows how to run the application 44 and knows how to run the IP protocols to communicate directly with the messaging server via the packet switched network 50. An example of a thin client 42b is a PC that has a web browser 56, which, in this case, can use IP protocols such as HTTP to receive and display web pages generated according to hypertext markup language (HTML) from server locations based on uniform resource locators (URL's) input by the user of the PC.

As shown in FIG. 1, each of the clients (tiny clients 18d, 18e, 18f; skinny clients 18a, 18b, 18c; thin clients 42b; and fat clients 42a) are able to communicate via a single, unified architecture 60 that enables voice communications services between different clients, regardless of whether the client actually has browser capabilities. Hence, the fat client 42a and the thin client 42b are able to execute voice enabled web applications without any hardware modification or any modification to the actual browser; rather, the browsers 56 in the clients 42a and 42b merely are provided with an executable voice resource configured for providing browser audio control, described below.

The user devices 18a, 18b, and 18c, illustrated as a cordless telephone 18a, a fax machine 18b having an attached telephone, and an analog telephone 18c, are referred to herein as "skinny clients," defined as devices that are able to interface with a user to provide voice and/or data services (e.g., via a modem) but cannot perform any direct control of the associated access subnetwork.

The wireless user devices 18d, 18e, and 18f, illustrated as a cellular telephone (e.g., AMPS, TDMA, or CDMA) 18d, a handheld computing device (e.g., a 3-Com Palm Computing or Windows CE-based handheld device) 18e, and a pager 18f, are referred to as tiny clients. "Tiny clients" are distinguishable from skinny clients in that the tiny clients tend to have even less functionality in providing input and output interaction with a user, rely exclusively on the executable application in an access subnetwork to initiate communications; in addition, tiny clients may not be able to send or receive audio signals such as voice signals at all.

Hence, the skinny clients 18a, 18b, and 18c and the tiny clients 18d, 18e, and 18f access the unified voice messaging services in the unified network 60 via a proxy browser 62, configured for providing an IP and HTTP interface for the skinny clients and the tiny clients. In particular, browsers operate by interpreting tags within a web page supplied via an HTTP connection, and presenting to a user media content information (e.g., text, graphics, streaming video, sound, etc.) based on the browser capabilities; if a browser is unable to interpret a tag, for example because the browser does not have the appropriate executable plug-in resource, then the browser typically will ignore the unknown tag. Hence, the proxy browser 62 can provide to each of the skinny clients and tiny clients the appropriate media content based on the capabilities of the corresponding client, such that the cordless telephone 18a and telephone 18c receive analog audio signals played by the proxy browser 62 and no text information (unless a display is available); the fax machine 18b and pager 18f only receive data/text information, and the cellular telephone 18d and the handheld computing device 18e receive both voice and data information. Hence, the proxy browser 62 interfaces between the IP network and the respective local access devices for the skinny clients and the tiny clients to provide access to the unified messaging network 60.

The proxy browser 62 and the web browsers 56 within the fat client 42a and the thin client 42b execute voice enabled web applications by sending data and requests to a web server 64, and receiving hypertext markup language (HTML) web pages from the web server 64, according to hypertext transport protocol (HTTP). The web server 64 serves as an interface between the browsers 56, 62 and an application server 66 that provides an executable runtime environment for XML voice applications 68. For example, the web server 64 may access the application server 66 across a common gateway interface (CGI), by issuing a function call across an application programming interface (API), or by requesting a published XML document or an audio file requested by one of the browsers 56 or 62. The application server 66, in response to receiving a request from the web server 64, may either supply the requested information in the form of an HTML page having XML tags for audio control by a voice resource within the browser, or may perform processing and return a calculated value to enable the browser 56 or 62 to perform additional processing.

The application server 66 accesses selected stored XML application pages (i.e., pages that define an application) and in response generate new HTML pages having XML tags during runtime and supply the generated HTML pages having XML tags to the web server 64. Since multiple transactions may occur between the browser 56 or 62 and the application server 66, the application server 66 is configured to store, for each existing user session, a data record, referred to as a "brownie", that identifies the state of the existing user session; hence, the application server 66 can instantiate a procedure, return the necessary data, and terminate the procedure without the necessity of maintaining the instance running throughout the entire user session.

Hence, the application server 66 executes voice application operations from a stored XML document based on a transient application state, where the application server 66 terminates the application instance after outputting the generated XML media information to the browser 62.

Figure 2:
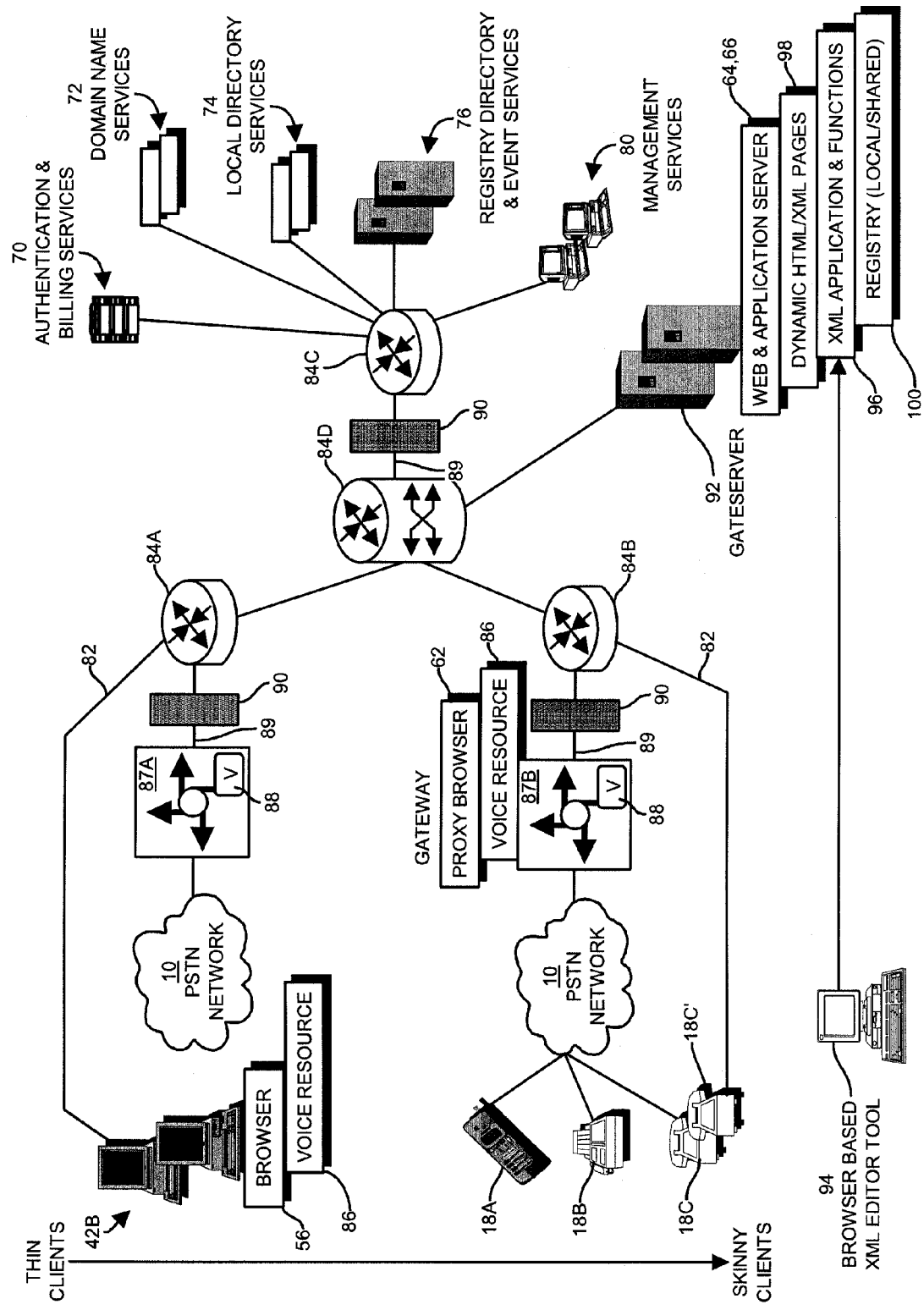
FIG. 2 is a diagram illustrating in further detail implementation of audio applications on the IP network of FIG. 1 according to an embodiment of the present invention.

FIG. 2 is a diagram that illustrates in further detail the network 60 of FIG. 1, based on FIG. 4 of the above-incorporated application Ser. No. 09/480,485. As shown in FIG. 2, the arrangement of providing browser audio control for voice enabled web applications by the web server 64 and the application server 66 enables voice application services to be implemented in a web server paradigm for many different telephony services, including authentication and billing services 70, domain name services 72, local directory services 74, registry directory and event services 76, and management services 80.

In addition to FIG. 1, FIG. 2 includes PSTN 10, voice resources 86, IP (Internet Protocol) connections 82, routers 84a, 84b, 84c, 84d, IP gateway 87a, 87b, voice over IP interface 88, HTTP connections 89, firewalls 90, gateserver 92, a browser based XML editor tool 94, XML applications and functions 96, dynamic HTML/XML pages 98, and a registry 100. FIG. 2 also illustrates in further detail the browser and web application server interaction. In particular, the thin clients 42b (and fat clients 42a) may be configured for accessing the web server 64 via a direct IP connection 82 to a router 84. The thin client 42b can directly access the web server 64 for voice enabled web application services if the thin client 42b has a browser 56 and an executable voice resource 86, for example an executable XML aware plug-in resource, or a Java applet embedded within a received HTML page. Alternatively, the thin client 42b may access the web server 64 via the public switched telephone network 10, where an IP gateway 87a includes a voice over IP interface 88 that sends information to the server 64 using an HTTP connection 89 via a firewall 90.

Since the skinny clients and tiny clients 18 do not have browser resources, the skinny clients and tiny clients 18 access the proxy browser 62 via the PSTN 10 and the IP gateway 87b. The IP gateway 87b includes both a proxy browser 62 and a voice resource 86, enabling the IP gateway 87 to provide all audio control service for the skinny clients and tiny clients 18. Hence, the PSTN 10 is used merely for transfer of analog audio signals, with intelligent application processing being provided by the proxy browser 62. Note that if one of the telephones 18c' is an IP telephone, then it can access the server 64 via an IP connection 82; in this case, the browser internal to the IP telephone 18c' processes only audio functions, and ignores any tags associated with text or image content.

As shown FIG. 2, the web server 64, the application server 66, and the voice web applications 68 reside within a gateserver 92. The gateserver 92 includes a browser based XML editor tool 94 that enables a web programmer to design voice applications using XML pages. The XML pages are stored as XML applications and functions 96, for example within a document database accessible by the application server 66. The XML pages stored within the XML application and functions database 96 may be stored as static pages to be fetched by the web server 64 and supplied to a browser, however the XML pages may also define the actual application to be executed by the application server 66 in runtime.

According to the disclosed embodiment, the browsers 56 and 62 provide audio control for voice enabled web applications based on the HTML-XML pages supplied by the application server 66 to the web server 64 for transport across an HTTP connection.

The application server 66 executes stored XML applications, also referred to generally as a web applications, in response to HTML requests from the user. In particular, four types of XML documents are used by the application server 66 to execute web applications: menu documents, activity documents, decision documents, and "brownies". The menu documents, activity documents, and decision documents are XML documents that define user interface and boolean-type application logic for a web application, hence are considered "executable" by the application server 66. The brownie document is an XML data record used to specify application state and user attribute information for a given XML application during a user session. During execution of the stored XML applications, the application server 66 stores the "brownie" in a registry 100.

Hence, the XML documents define user interface logistics and tie services and application server events together in a meaningful way, forming a coherent application or sets of applications. Additional details regarding the definition of executable voice applications using XML documents are described in the above-incorporated application Ser. No. 09/501,516.

Figure 3:
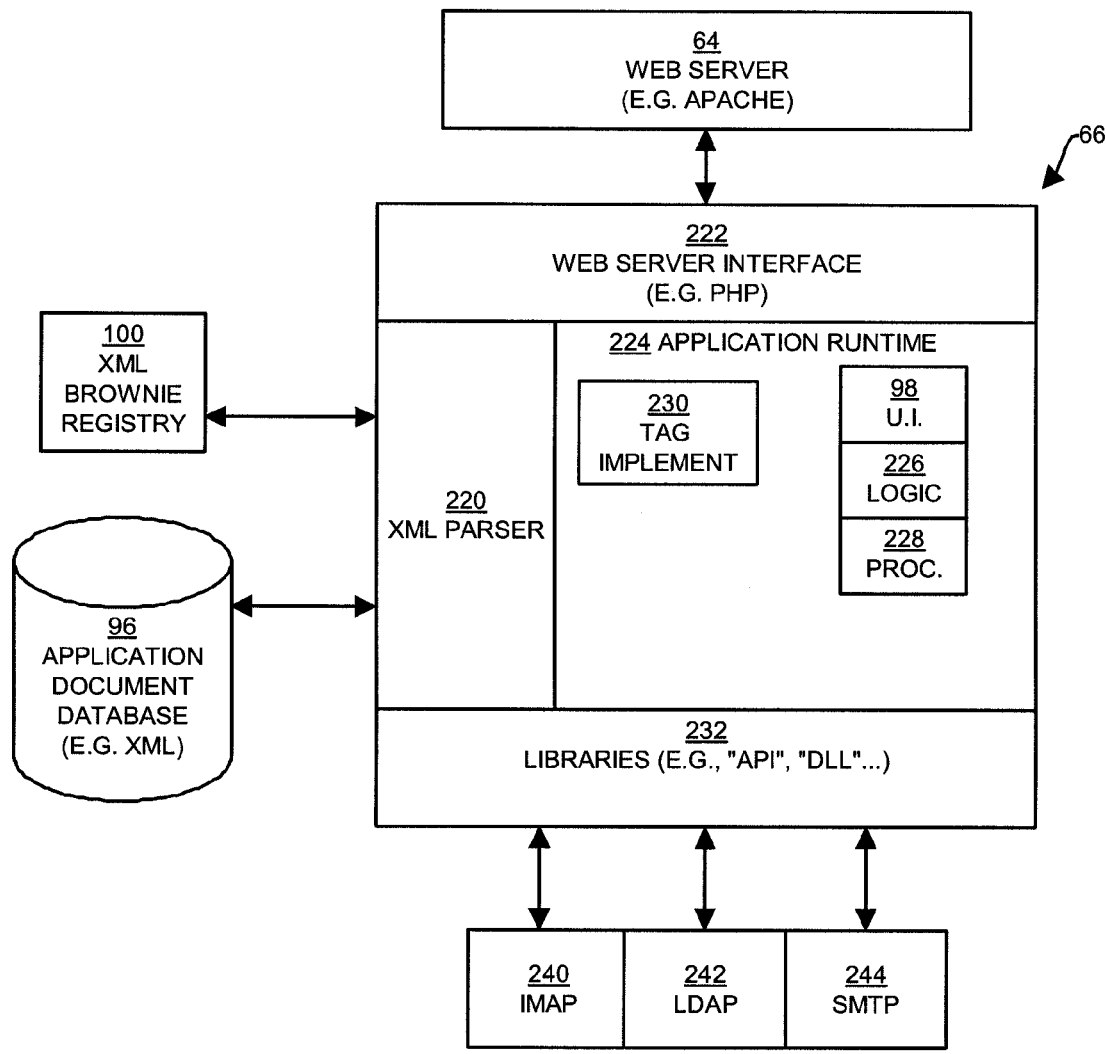
FIG. 3 is a diagram illustrating in detail the application server of FIG. 2 according to an embodiment of the present invention.
Figure 8:
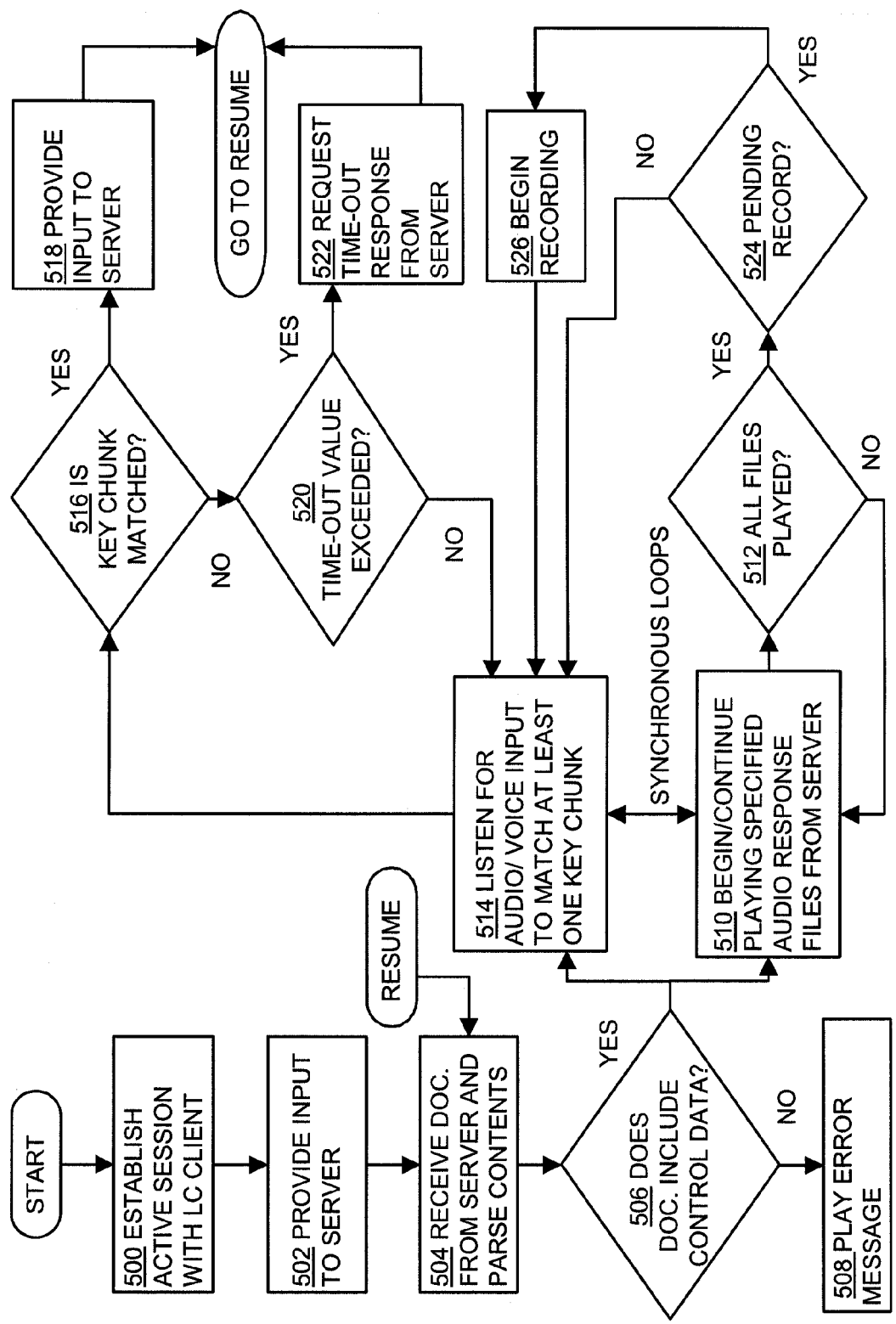
FIG. 8 is a flow chart of the process of providing an audio-based response under the control of a proxy browser, according to one embodiment of the invention.

FIG. 3 is a diagram illustrating in detail the application server 66 according to an embodiment of the present invention, based on FIG. 8 of the above-incorporated application Ser. No. 09/480,485. The application server 66 is implemented as a server executing a PHP hypertext processor with XML parsing and processing capabilities, available open source at a web site currently having an address of "php.net" at the date of the filing of this application. As shown in FIG. 3, the server system 66 includes an XML parser 220 configured for parsing the application-defining XML documents stored in the XML document database 96, or the XML documents (i.e., "brownies") stored in the registry 100 and configured for specifying the state and attributes for respective user sessions. The application server 66 also includes a high speed interface 222 that establishes a high-speed connection between the application server 66 and the web server 64. For example, the PHP hypertext processor includes a high-speed interface for Apache web servers.

The application server 66 also includes a runtime environment 224 for execution of the parsed XML documents. As described above, the runtime environment 224 may selectively execute any one of user interface operation 98, a logic operation 226, or a procedure call 228 as specified by the parsed XML document. In particular, the application runtime environment 224 includes a tag implementation module 230 that implements the XML tags parsed by the XML parser 220. The tag implementation module 230 performs relatively low-level operations, for example dynamically generating an XML menu page in response to detecting a menu tag, performing a logical operation in response to a decision tag, or fetching an audio (.wav) file in response to detecting a sound tag. Hence, the tag implementation module 230 implements the tag operations that are specified within the XML framework of the stored XML documents.

The application server 66 also includes a set of libraries 232 that may be implemented as dynamically linked libraries (DLLs) or application programming interface (API) libraries. The libraries 232 enable the runtime environment 224 to implement the procedures 228 as specified by the appropriate XML document. For example, the application server 66 may issue a function call to one of a plurality of IP protocol compliant remote resources 240, 242, or 244 according to protocols based on IMAP (Internet Message Access Protocol), LDAP (Lightweight Directory Access Protocol), or SMTP (Simple Mail Transfer Protocol), respectively. For example, the PHP hypertext processor includes executable routines capable of accessing the IMAP or LDAP services. Note that the mechanisms for accessing the services 240, 242, or 244 should be established within the application server 66 before use of XML documents that reference those services.

FIGS. 4A and 4B are diagrams illustrating XML expressions usable for browser audio control. In contrast to HTML, XML does not define output, but rather XML defines data. Hence, XML enables a browser 56 or 62 to exchange data with a voice resource 86 such as a plug-in resource or a Java applet, or an application server 66 via a CGI. Hence, use of XML provides precise control between the voice resource 86 and the application server 66, across an HTTP connection, using a structured and open protocol as opposed to a closed, proprietary protocol. Hence, different voice applications can be developed and shared between multiple programmers based on the open architecture of XML, resulting in new opportunities for web programmers to develop and improve voice applications in a web based paradigm.

As shown in FIG. 4A, a set of XML tags may be generated, by the application server 66, that provide a set of controls for a plug-in resource. For example, the XML tag 101 specifies plug-in control elements to be used for controlling an XML aware plug-in resource. The plug-in control elements include a prompt list 102 that includes an attribute (prefetch) that instructs the plug-in resource 86 to automatically fetch the prompts 104 and 106, identified as audio files "wav1.wav" and "wav2.wav", from the application server 66 and play them sequentially as prompts. Note that conventional HTML web browsers could not execute more than one audio file at a time, since the browser would not know whether to play all the audio files simultaneously, or interrupt the playing of one audio file with another audio file, or play only one of the audio files. The extensible nature of XML elements, however, enables attributes to be defined for each XML element; hence, the XML aware plug-in resource 86 knows that it needs to prefetch all the .wav files specified in XML tags 104 and 106, and play them in sequence.

FIG. 4B illustrates an alternative format for specifying the prompts 104 and 106. In particular, the XML tag 108 is encased within tags, enabling a standard browser 56 that does not understand the prompt tag to easily discard/ignore the XML tag 108. Hence, the structure of FIG. 4A use more adapted for XML parsing, however an HTML browser that does not have an XML aware plug-in resource may misinterpret one of the prompts 104 or 106, and erroneously parse one of the prompts 104 or 106 as data to be displayed. Hence, the structure of FIG. 4B is preferable to insure that an HTML browser does not misinterpret an XML expression.

FIG. 4A also illustrates an XML element 110 that defines hotkey pattern values in XML tag 112 that enables the XML aware plug-in resource 86 to initiate execution of a prescribed audio operation in response to detecting a single key input (e.g., *5) by immediately posting the single key input to the server 66 and receiving another XML page that includes the prescribed audio operation, in contrast to HTML form tags, which cannot automatically submit data to a web server upon receipt of a digit. Hence, the ability to define hotkey pattern values enables a web application developer to use XML to define applications that perform voice mail type operations, such as responding to hotkey inputs. As described below, the appearance of hotkey pattern values is implemented merely by posting the input upon receipt thereof, and receiving another XML page.

As described above, the browsers 56 and 62 enable a user□s device to be isolated from the web server application side (64, 66) of the network. Hence, user devices (e.g., 18a, 18b, 18c, 42) interacting with the respective browsers 56 or 62 may have completely different hardware or software configurations, as well as different operating environments. In addition, the browser strategy of tagging is flexible, since one user device may not have a microphone, another user device may not have speakers, and another device may not have an alphanumeric or graphical display.

According to the disclosed embodiment, the proxy browser 62 is configured for selectively executing the HTML tags and the XML tags based on capabilities data stored for the corresponding user device 56, 18. In particular, the proxy browser 62 stores for each corresponding user device capabilities data that specifies functions that the user device 56, 18 is able to perform. For example, the capabilities data will specify for each user device 56, 18 whether the user device includes a display for alphanumeric or graphical images, whether the user device includes a sound processor for playing digital audio files via a speaker and recording digital audio files using a microphone, whether the user device has a microphone and speaker for reception and playback of analog audio signals, or whether the user device has a numeric keypad (digital or DTMF) or any key for accepting user inputs.

Figure 5:
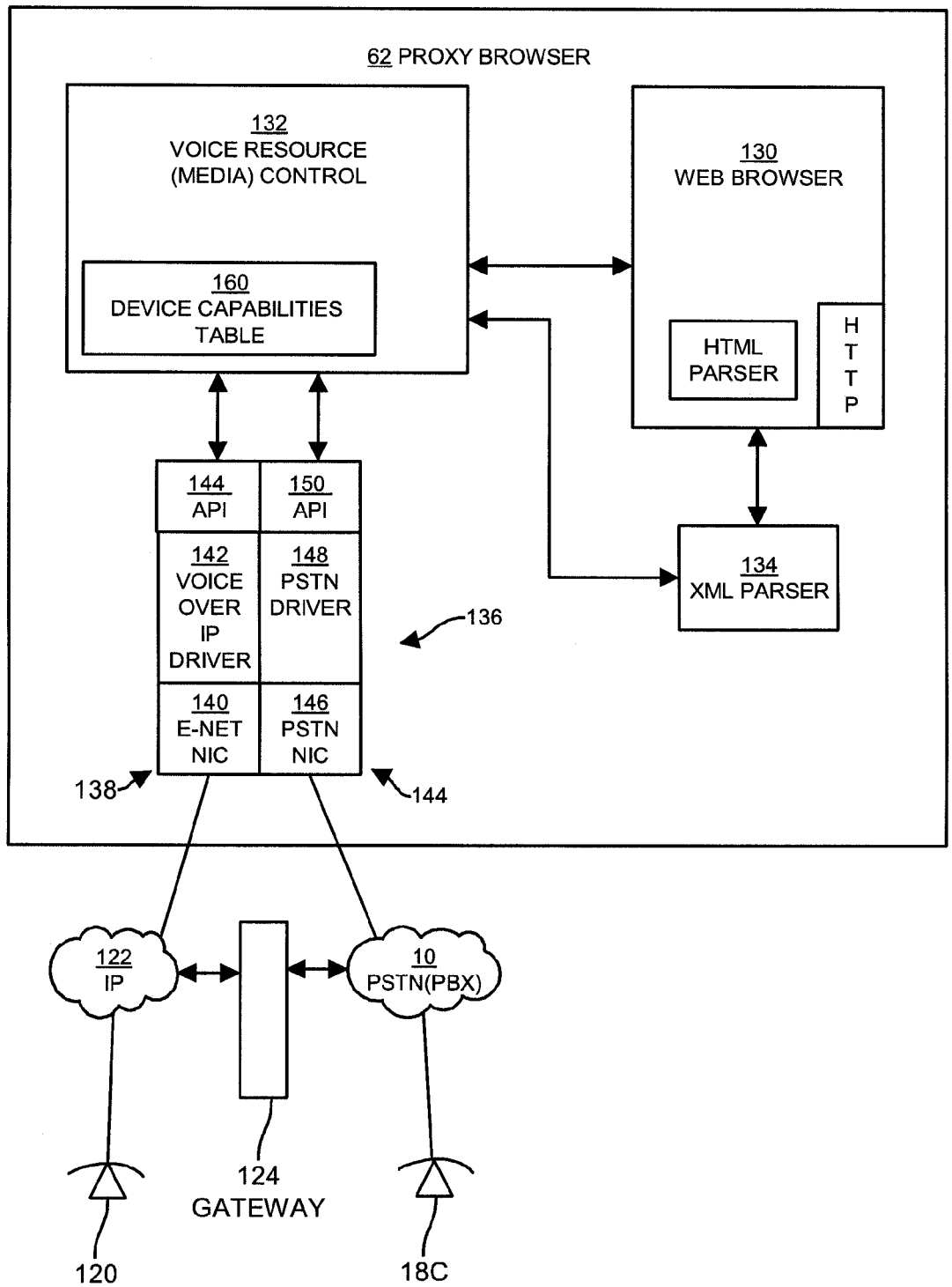
FIG. 5 is a block diagram illustrating in further detail the proxy browser of FIG. 2 according to one embodiment of the invention.

FIG. 5 is a diagram illustrating in detail the proxy browser 62 configured for providing web application audio control for user devices 18 according to one embodiment of the invention. In FIG. 5, the proxy browser 62 includes a media (voice) browser control 132, a web browser 130, an XML parser 134, and device interface 136. The proxy browser 62 is configured for providing audio control for devices such as an analog telephone 18c via the PSTN 10, or an Internet protocol telephone 120 having an IP connection via an IP-based packet switched network 122, or any of the skinny or tiny client devices 18 as illustrated in FIG. 1. As shown in FIG. 5, the analog telephone 18c may also be connected to the IP network 122 via a voice over IP gateway 124.

The proxy browser 62 includes an HTTP-compliant (i.e. web) browser 130, a voice resource control 132 similar to the voice resource 86 of FIG. 2, an XML parser 134, and a device interface 136. The device interface 136 provides a connection for the proxy browser 62 with the user device, for example the telephone 18c or the IP telephone 120, via the corresponding user device access network 10 or 122. In particular, the device interface 136 includes network specific hardware interface cards and associated drivers that enable the voice resource control 132 to send voice audio commands to the device interface 136; the device 136 then implements those audio commands according to the specific protocols of the network coupling the user device to the proxy browser 62.

For example, the device interface 136 includes an IP network interface card 138 that includes an Ethernet (IEEE 802.3) network interface card 140, and voice over IP control software 142 that is compliant, for example, with Recommendation H.323 from the Telecommunication Sector of the International Telecommunication Union (ITU-T)). The control software 142 serves as the driver software for the Ethernet card 140. The voice over IP control software 142 may include a set of application programming interfaces 144 that enable the voice resource control 132 to issue function calls to the voice over IP control software 142; alternatively, the voice resource control 132 may issue function calls directly to the voice over IP software 142, bypassing the API routines 144. Exemplary H.323 compliant IP network interface cards 138 are available from Intel, Inc. or RADVision, Inc, Mahwah, N.J.

The device interface 136 also includes a PSTN network interface card 144 configured for sending and receiving audio signals such as voice signals in response to voice audio commands from the voice resource control 132. The PSTN network interface card 144 includes a hardware network interface card 146, and associated driver software 148 for controlling the network interface card 146. As described above, the driver software 148 may include a set of APIs 150 that enable the voice resource 132 to issue function calls to the driver software 148; alternatively, the voice resource control 132 may issue function calls directly to the driver software 148. An exemplary network interface card 144 is available from Dialogic, Inc., Parsippany, N.J.

Hence, the IP network interface card 138 and the PSTN network interface card 144 each are able to perform basic telephony type functions, such as detect an on hook or off-hook condition by the corresponding user device (e.g., IP phone 120 or analog telephone 18c), detect an incoming phone call or message under the control of the voice resource control 132 and notify the corresponding user device accordingly (e.g., by ringing the device or flashing an alert message, etc.), and send and receive audio signals between the user device and the voice resource controller 132.

The browser 130 is configured for sending and receiving HTTP pages to and from the application server 66 according to HTTP protocol. In addition, the browser 130 communicates with the XML parser 134, which is configured for parsing the XML tags within the received web page. The XML parser 134 forwards the XML tags recovered from the received web page to the voice resource control 132. If desired, the voice resource control 132 may be implemented to include the XML parser 134.

The voice resource control 132, also referred to as a media resource, is configured for selectively implementing the HTML and/or XML tags from the browser 130 and the XML parser 134, respectively, based on the capabilities of the user device that is to receive the information in the HTML and/or XML tags. In particular, the voice resource control 132 includes a device capabilities table 160 configured for storing the capabilities of the corresponding user device. For example, the device capabilities table 160 includes for each user device a unique device identifier, a network address (e.g., a 10 digit telephone number or an IP address), and an identification of the capabilities of the user device. For example, the device capabilities table 160 specifies whether the user device accepts only text data, such as a pager device, and whether the user device is able to respond to a single prompt or multiple prompts. Alternately, the device capabilities table 160 may specify whether the user device accepts only analog audio data (e.g., an analog speaker), or whether the user device includes an audio processor configured for playing digital audio data. The device capabilities table 160 also specifies whether the user device has a microphone for generating analog audio signals, and whether the user device has been analog to digital converter for converting the analog audio signals to digital audio data.

Hence, the voice resource control 132, upon determining the capabilities of a corresponding user device, selectively implements HTML tags and/or XML tags by outputting the appropriate commands to the device interface 136. Hence, any user device can be served by the proxy browser 62, regardless of the capabilities of the user device, since the proxy browser 62 provides to the user device only the information that the corresponding user device can process.

Figure 6:
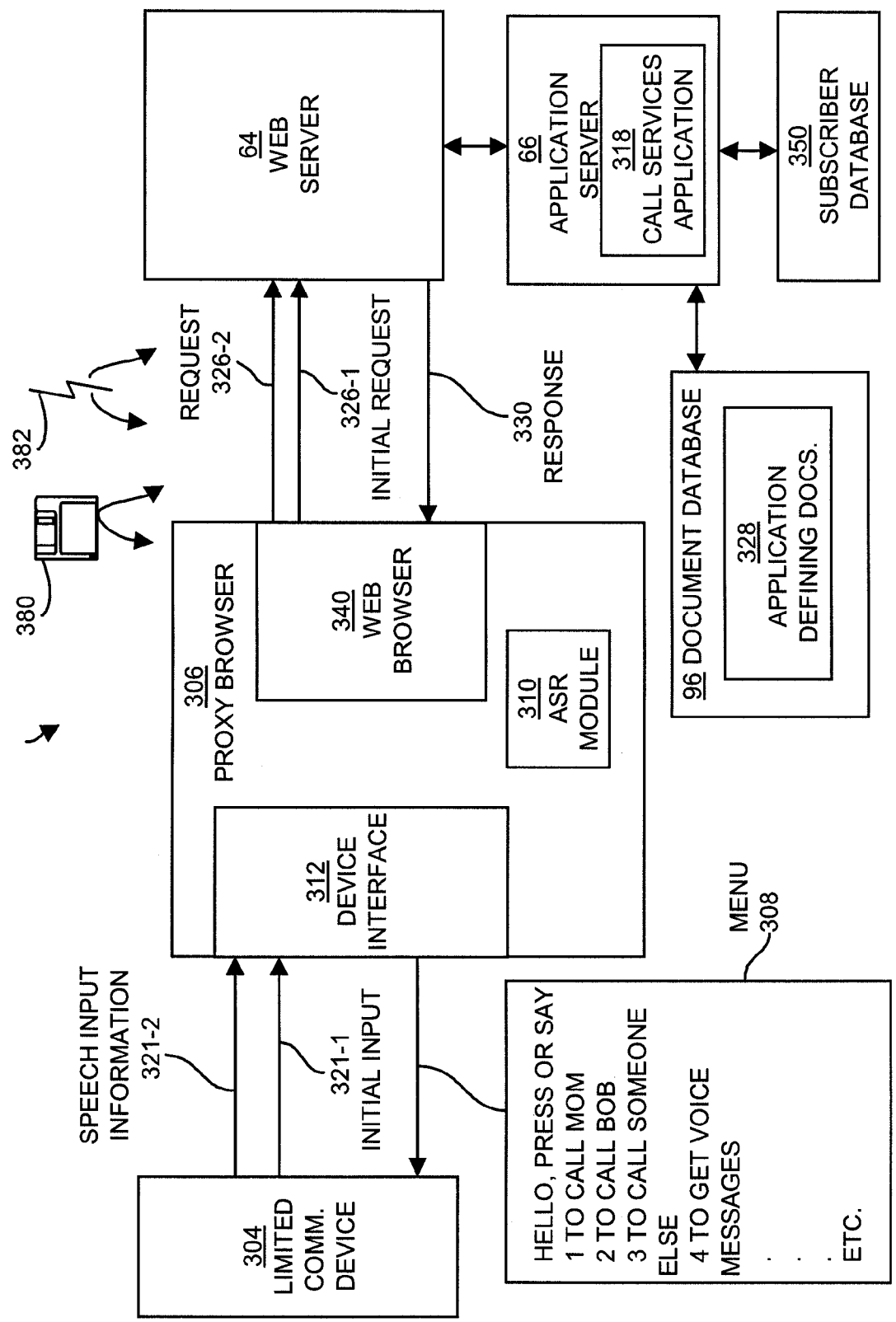
FIG. 6 is a block diagram illustrating an audio interface system including a proxy browser, application server, document database, subscriber database, personalized audio-based menu, and limited communication device according to one embodiment of the invention.

FIG. 6 illustrates, for one embodiment of the present invention, a block diagram illustrating an interface system 300 including a limited communication device 304, proxy browser 306, web server 64, application server 66, document database 96, subscriber database 350, and personalized audio-based menu 308, according to one embodiment of the invention.

The limited communication device 304 is an audio communication device, such as cordless telephone 18a, fax machine having an attached phone 18b, analog telephone 18c, cellular telephone 18d (see FIG. 1) or other telephony or two-way audio-based communication device, such as an IP telephone 120 (see FIG. 5). In one embodiment, the limited communication device 304 can process, initiate, and respond to signals based on conventional telephony or other two-way communication protocols for audio devices, but typically is limited in its ability to understand and process other protocols. For example, the limited communication device 304 is not designed to process Internet or WAP protocols, and does not include a web browser allowing direct access to the web without some intermediary device. In an additional example, the limited communication device does not include software or hardware to process markup languages, such as HTML, XML, or WML.

The network browser or proxy browser 306 is an alternate embodiment of the proxy browser 62 of FIG. 2 and provides access to a network, such as the Internet (e.g. 50, as shown in FIG. 1). The proxy browser 306 includes an ASR module 310, device interface 312, and a web browser 340 in communication with the web server 64 over a network. In one embodiment, the ASR module 310 is a software module executing on the proxy browser 306. The ASR module 310 translates audio signals, such as speech information, into words or phrases in a data or text format that the proxy browser 306 can process. The web browser 340 is an alternate embodiment of the web browser 130 of FIG. 5. The device interface or interface connection 312 is a communication interface providing a connection to the limited communication device 304. The device interface 312 is one example of the device interface 136 illustrated in FIG. 5.

The application server 66 is in communication with the web server 64. The application server 66 includes, in an embodiment of the present invention, the call services application 318. The call services application 318 is an executable resource 318 on the application server 66. The call services application 318 includes scripts, procedures and other software entities, such as procedures 228, as shown in FIG. 3, and one or more application-defining tagged documents 328 (e.g. XML menu/decision documents) stored in an application document database 96 and executed in the application runtime 224 of the application server 66. The call services application 318 initiates a call service, such as an outgoing telephony call, based on a verbal command, such as "Call Bob." In addition to placing an outgoing telephony, call services can include accessing voice mail, accessing electronic mail, accessing a telephone number or other data from a database, adding a telephone number and name, or other data, to a database, or providing other services, based on the user's verbal request.

The application server 66 is in communication with a user database 350 that includes profile information for subscribers to the call services provided by the call services application 318. The call services application 318 uses the subscriber database 350 to obtain data needed to interpret the subscriber's commands, such as Bob's telephone number, when the subscriber makes a verbal request to call Bob. In other embodiments, the database 350 is an LDAP directory storing a profile for the subscriber, or an IMAP database storing a directory for the subscriber. The subscriber can supply the personalized data when initially subscribing to the call services application 318 (e.g. by filing out a hardcopy or electronic form), by adding a name and phone number using a verbal command, providing the data by electronic mail, or by other approaches commonly used to supply data to a database.

In one embodiment, a computer program product 380 including a computer readable medium (e.g. one or more CDROM's, diskettes, tapes, etc.) provides software instruction for the proxy browser 306 and/or the call services application 318. The computer program product 380 can be installed by any suitable software installation procedure, as is well known in the art. In another embodiment, the software instructions for the proxy browser 306 and/or the call services application 318 can also be downloaded over a wireless connection. A computer program propagated signal product 382 embodied on a propagated signal on a propagation medium (e.g. a radio wave, an infrared wave, a laser wave, sound wave, or an electrical wave propagated over the Internet or other network) provides software instructions for the proxy browser 306 and/or the call services application 318. In alternate embodiments, the propagated signal is an analog carrier wave or a digital signal carried on the propagated medium. For example, the propagated signal can be a digitized signal propagated over the Internet or other network. In one embodiment, the propagated signal is a signal that is transmitted over the propagation medium over a period of time, such as the instructions for a software application sent in packets over a network over a period of seconds, minutes, or longer.

Figure 7:
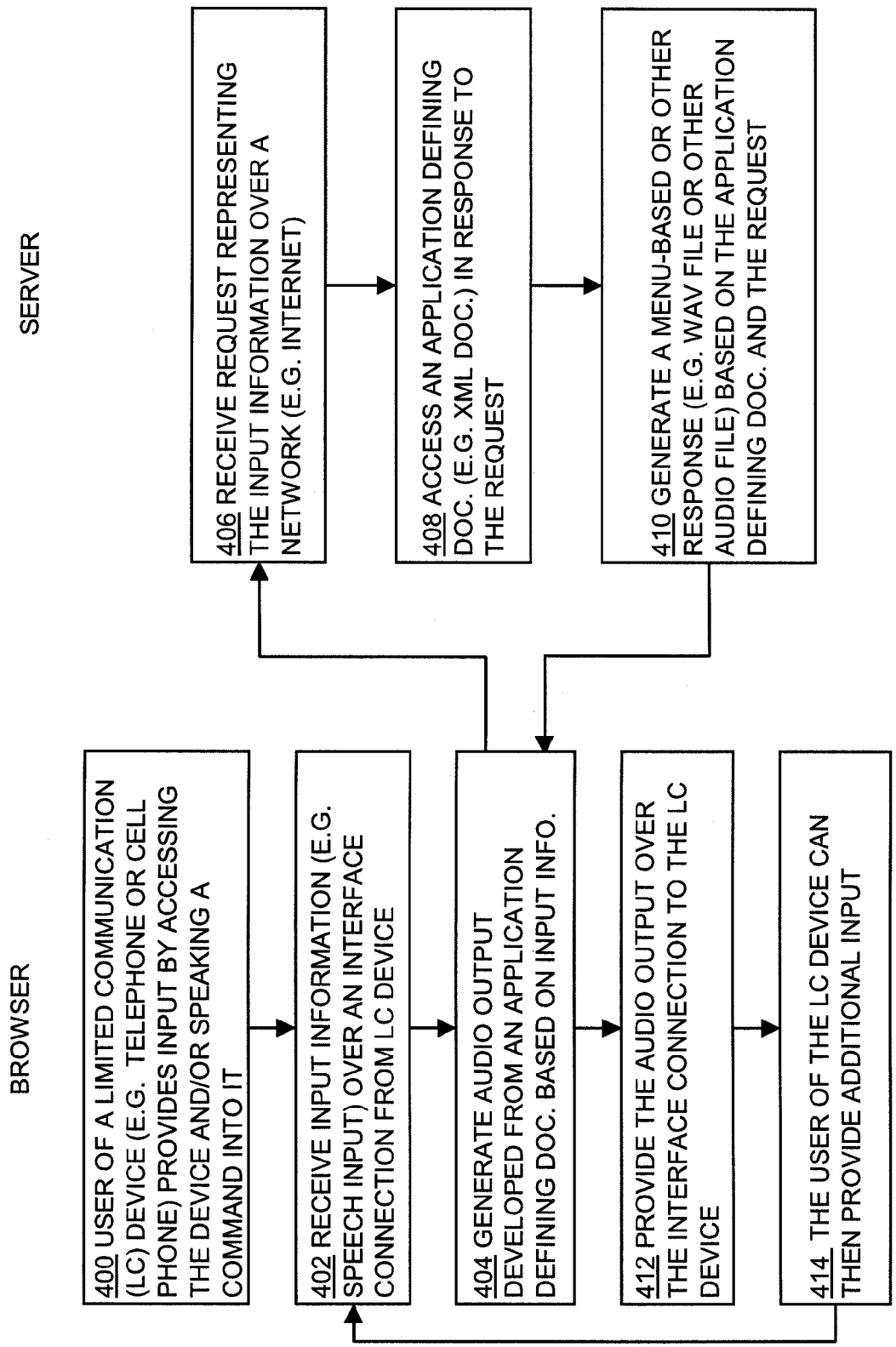
FIG. 7 is a high level flow chart of the process of providing an audio-based response from a proxy browser and application server to a user of a limited communication device according to one embodiment of the invention.

FIG. 7 is a high level flow chart of the process of providing an audio-based response from a proxy browser 306 and application server 66 to a user of the limited communication device 304 according to one embodiment of the invention. In step 400, the user of a limited communication device 304 provides input, generally referred to as input information 321, by accessing the device 304 or speaking a command into it. Alternately, the user can provide a DMTF (discrete multitone frequency) input by pressing one or more keys on the keypad of the limited communication device 304. In step 402, the device interface 312 receives the input information 321 from the limited communication device 304. For example, the device interface 312 receives input information 321 from an analog telephone 18c via a PSTN 10 or from an IP telephone 120 having an IP connection via an IP-based packet network 122 (as shown in FIG. 5). In one embodiment, the input information 321 is an initial access input 321-1, and the device interface 312 receives the initial access input 321-1 indicating an initial access to the limited communication device, such as detecting an "off hook" condition for an analog telephone 18c. In one embodiment, the proxy browser 306 is capable of connection to several limited communication devices 304 at one time. For example, the proxy browser 306 can watch or monitor the limited communication devices 304. When a user picks up the handset of the telephone 18c, the device interface 312 receives the input 321-1 through a PSTN gateway 10 (alternatively, through a IP gateway 122 or other gateway). The proxy browser 306 identifies the identity of the limited communication device 304 when it is accessed. For example the proxy browser 306 identifies the phone number of the limited communication device 304. If the user places a call, the proxy browser 306 identifies the originating telephone number (e.g. the telephone number of the limited communication device 304), the called number, and the forwarding telephone number (if applicable). (See FIG. 8 for a more detailed flowchart of a sample process followed by the proxy browser 306 for receiving input from the user.)

In summary, the proxy browser 306 generates an audio output developed by the application server 66 from an application defining document 328 based on the input information 321 (step 404). Specifically, the web browser 340 associated with the proxy browser 306 initiates an active session with the limited communication device 304, and generates a request, generally referred to as request 326, to the application server 66. For example, the proxy browser 306 generates an HTTP "POST/GET" initial request 326-1 for posting to the URL (e.g. for an application server 66) associated with the telephone number of the limited communication device 304, or associated with a user of the limited communication device 304. The web browser 340 sends the URL request 326-1 to a web server 64 associated with the application server 66. For example, if the limited communication device 304 has the telephone number 123-1234 as its telephone number, the browser 340 generates a URL request 326-1, such as "http://appserver.net/1231234". This URL request 326-1 is an example of an initial request that indicates that a user has made an initial access (e.g. picked up the handset) to the limited communication device 304 and is awaiting a response (as will be discussed later). If a specific number or identity of the limited communication device 304 is not available, then the browser 340 posts the request 326-1 from the user to a default application server 66, rather than an application server 66 specifically associated with the user.

The web server 64 receives the request URL request 326 (as discussed above) that represents the input information 321 from the web browser 340 associated with the proxy browser 306 (step 406). The application server 66 then prepares a response 330 to the URL request 326 based on one or more application-defining documents 328 stored in the document database 96. In one embodiment, the application server 66 accesses profile information from a subscriber database 350 that contains profiles of subscribers to the services provided by the call services application 318. The database 350 includes personalized data for each subscriber. For example, application server 66 uses the database 350 to determine what telephone number to call when the subscriber verbally requests that a telephone call be made to some individual.

The application server 66 accesses an application-defining document 328 (e.g. a tagged or an XML document) that includes modifiable responses in response to the URL request 326 representing the input information 321 (step 408) The response 330 to the request 326 may include directives to play a list of audio media specified by the application server 66 and the application-defining documents 328. The application server 66 generates a menu-based or other response suitable for audio output based on the application-defining document 328 and the URL request 326 representing the input information 321 (step 410). For example, if the input information 321 is an input 321-1 indicating an initial access to the limited communication device 304, then the application server 66 uses a TTS technique to convert the text information in an XML document 328 into an audio initial menu in the form of audio files (such as .wav files).

The application server 66 returns the audio files to the proxy browser 306 and references them in an HTML file for the proxy browser 306 to play back to the limited communication device 304. Thus, the proxy browser 306 provides the audio output over the device interface 312 to the limited communication device 304 (step 412).

The user can then provide speech input information 321-2 (step 414). For example, in response to an input signal indicating initial access to the limited communication device 304, the proxy browser 306 plays back a response, such as the sample personalized menu 308, to be heard by the user of the limited communication device 304 as the response to the user picking up the handset. The user can then provide the speech input information 321-2 by selecting one of the options of the menu 308 either by saying the number, or saying a verbal command from a menu (e.g. the personalized menu 308), such as "Call Bob." Alternatively, the audio output provided by the application server 66 and played by the proxy browser 306 is a welcome tone (i.e. a tone different from the conventional dial tone). After hearing the welcome tone, the user can speak verbal commands such as "Hello," "Call," or "Messages." Then the user provides additional speech input information 321-2, which is received by the proxy browser 306 (step 402), and another response is generated (steps 404 through 412). This speech input information 321-2 is processed by the proxy browser 306 as described in FIG. 8.

FIG. 8 is a flow chart of the process of providing an audio-based response under the control of a proxy browser 306, according to one embodiment of the invention. First, the proxy browser 306 detects an input 321 from the limited communication device 304, which is speech input information 321-2, or other input, such as an input 321-1 indicating initial access to the device 304, as described above. The proxy browser 306 establishes an active session with the limited communication device 304 (step 500), and the web browser 340 provides an initial URL request 326-1 to the application server 66 (step 502), as described above. The web server 64, in response to receiving the request 326-1, forwards the request 326-1 to the application server 66 across a connection, for example, a common gateway interface (CGI). The application server 66 returns a response document 330 in the form of a generated page, such as a page including HTML and XML tags, to the proxy browser 306.

The proxy browser 306 receives the response document 330 and parses the contents (step 504). The response document 330 typically includes sound files, expected input patterns (such as key chunk phrases or digit patterns), time-out length, time-out action, and an indication whether a record operation is required. The XML tags within the response document 330 typically include XML directives that specify, for example, prompts to play, input patterns to match, and optionally time-out parameters and record control.

The proxy browser 306 then checks in step 506 whether the XML data includes control data that is essential to provide voice application control to the limited communication device 304. If the proxy browser 306 determines in step 506 that the response document 330 does not include essential control data from the application server 66, then the proxy browser 306 plays a stored system level prompt in step 508 indicating that service is unavailable.

If the proxy browser 306 determines in step 506 that the response document 330 includes the essential control data, then, in step 510, the proxy browser 306 begins to play sound files (e.g., an .wav audio file) fetched by the web browser 340 from the web server 64, for example as a welcome greeting (step 510). Hence, the proxy browser 306 plays the audio files referred to in the response document 330 in the prescribed sequence as indicated in the response document 330 (step 510) while waiting for a user input 321-2 (step 514). Step 510 and 514 operate in synchronous loops until input 321-2 is provided or a time-out value is exceeded. If there is no user input 321-2, the proxy browser 306 continues to play the audio files (steps 510 and 512). For example, the proxy browser 306 plays one or more audio files from the response document 330 that provides a personalized menu 308 (see FIG. 6), and continues to play the audio files for the menu 308 in the prescribed sequence while waiting for the user to provide input 321-2. If the proxy browser 306 detects input 321-2 during the playing of the audio files, then it stops playing them.

In response to receiving input 321-2 from the limited communication device 304, the ASR module 310 in the proxy browser 306 determines if one or more key chunks of input information are detected and matched in the verbal stream of input information 321-2 (step 516). For example, the key chunks are commands or key phrases, such as "Call Bob" that the ASR module 310 is programmed to recognize. Alternatively, the proxy browser 306 determines if a pattern of digits provided in the response page 330 is matched. If the ASR module 310 determines that the one or more key chunks are matched, then the ASR module 310 causes the web browser 340 to post the data (i.e. send a request 326-2 including the matched key chunks or matched digits) to the URL for an application server 66 providing the calling services application 318. If in step 516 the input information 321-2 does not match the key chunks, then the proxy browser 306 checks in step 520 if a prescribed time-out value has been exceeded. If the prescribed time-out value has been exceeded, the proxy browser 306 causes the web browser 340 to request a time-out operation using a specified time-out URL (step 522).

The proxy browser 306 checks whether there is a record operation (e.g. recording of messages by a user) as specified in the response document 330, that is pending (step 524). If no record operation is pending, then the proxy browser 306 posts the matched key chunk data to the URL for the application server 66 providing the call services application 318. Hence, the proxy browser 306 can provide the appearance to the user that speaking an option from the menu 308 causes an immediate response in the proxy browser 306 to play another audio file, when actually the web browser 340 merely posts the user's matched key chunk data in the URL request 326-2 to the call services application 318, causing the application 318 to return another response document 330 including the sound to be played.

If a record operation is pending, the proxy browser 306 begins recording (step 526), for example by playing a tone to signal the user to begin speaking. In another embodiment, the proxy browser 306 records whatever the user provides as input 321-2 after the playing of an audio file, without a specific tone. The proxy browser 306 continues to record until a time-out occurs (e.g., 30 seconds), or the user enters a key or voice command indicating recording should be halted. In another embodiment, the ASR module 310 processes the input 321-2, determines when a key chunk match has occurred, and then halts the recording.

While this invention has been particularly shown and described with references to preferred embodiments thereof, it will be understood by those skilled in the art that various changes in form and details may be made therein without departing from the spirit and scope of the invention as defined by the appended claims.

For example, the application server 66 can use an ASR technique to process the input information 321 received from the proxy browser 306 without any ASR processing in the proxy browser 306. In general, either one of the ASR and TTS techniques can be performed in either the proxy browser 306 or the application server 66. For example, the proxy browser 306 can perform the TTS technique to translate generated text output provided by the application server 66 into an audio file.

In addition, the proxy browser 306 and application server 66 are not required to be connected by the Internet, but may be connected by other types of network or direct line connections, as is known in the art. Also, the functions and capabilities of the proxy browser 306 and application server 66, as described herein, can be implemented on one computer system, rather than separate computer systems, or on many computer systems, such as in a distributed object or other distributed computing approach.

What is claimed is:

1. A method in a server for providing an audibly controlled user interface for requesting call services over a network, the steps comprising:
    the server accessing an application defining tagged document in response to a request received from the proxy browser over the network;
    the server providing a response to the proxy browser, the response being suitable for audio output to a limited communication device based on the application defining tagged document and the request;
    the server receiving at least one key chunk of information over the network from the proxy browser based on speech input information from the limited communication device based on the response; and
    the server initiating a call service in response to receiving the at least one key chunk of information;
wherein:
    the step of accessing the application defining tagged document comprises accessing an extensible markup language document;
    the step of providing the response suitable for audio output based on the application defining tagged document comprises generating the response based on the extensible markup language document; and
    the step of providing the response includes generating an extensible markup language (XML) response document including (i) plugin control tags identifying control data to be used to control operation of a plug-in resource, (ii) prompt list tags identifying, as a first part of the control data, an ordered list of prompts, (iii) prompt tags identifying individual ones of the prompts in the ordered list, each prompt identified as a corresponding audio file, (iv) user input tags identifying, as a second part of the control data, user input data to be received as user input, (v) a hotkey pattern value tag identifying hotkey pattern values as the user input data, and at least one of (vi) expected input patterns including key chunks, (vii) time-out length, (viii) time-out action, and (ix) an indication whether a recording operation is required.

2. The method of claim 1, wherein the step of accessing the application defining tagged document in response to the request received over the network comprises receiving an input indicating an initial access to limited communication device.

3. The method of claim 1, wherein the step of accessing the application defining tagged document comprises receiving the request from proxy browser based on an interface connection between the proxy browser and the limited a communication device.

4. The method of claim 1, further comprising the step of providing a modified application defining tagged document based on dynamically changing modifiable responses in the application defining tagged document in response to the request.

5. The method of claim 1, further comprising the steps of receiving a modification input and providing a modified application defining tagged document based on dynamically changing modifiable responses in the application defining tagged document based on the modification input.

6. A processor-based server system for providing an audibly controlled interface over a network, the server system comprising:
   a document database configured for storing a plurality of application defining tagged documents; and
   an executable resource in communication with the document database and the network, wherein the executable resource
      accesses an application defining tagged document in response to a request from a proxy brower received over the network;
      provides a response to the proxy brower, the response being suitable for audio output to a limited communication device based on the application defining tagged document and the request;
      receives at least one key chunk of information from the proxy browser over the network based on speech input information from the limited communication device based on the response; and
      initiates a call service in response to receiving the at least one key chunk of information;
   wherein:
   the application defining tagged document is an extensible markup language document;
   the executable resource generates the response based on the extensible markup language document; and
   the executable resource provides the response by generating an extensible markup language (XML) response document including (i) plugin control tags identifying control data to be used to control operation of a plug-in resource, (ii) prompt list tags identifying, as a first part of the control data, an ordered list of prompts, (iii) prompt tags identifying individual ones of the prompts in the ordered list, each prompt identified as a corresponding audio file (iv) user input tags identifying, as a second part of the control data, user input data to be received as user input, (v) a hotkey pattern value tag identifying hotkey pattern values as the user input data, and at least one of (vi) expected input patterns including key chunks, (vii) time-out length, (viii) time-out action, and (ix) an indication whether a recording operation is required.

7. The processor-based server system of claim 6, wherein the request comprises an input indicating an initial access to the limited communication device.

8. The processor-based server system according to claim 7, wherein the input indicating the initial access is an input indicating an off-hook condition has been detected at the limited communication device.

9. The processor-based server system of claim 6, wherein the executable resource receives the request from the proxy browser based on an interface connection between the proxy browser and the limited communication device.

10. The processor-based server system of claim 6, wherein the executable resource dynamically changes modifiable responses in the application defining tagged document in response to the request to provide a modified application defining tagged document.

11. The processor-based server system of claim 6, wherein the executable resource receives a modification input and the executable resource dynamically changes modifiable responses in the tagged document in response to the modification input to provide a modified tagged document.

12. The processor-based server system according to claim 6, wherein the document database is operative to store extensible markup language (XML) documents defining a voice web application to be executed by the application server, the XML documents including menu documents, activity documents, decision documents, and application state documents, the menu documents, activity documents, and decision documents being application-defining XML documents that define user-interface and Boolean application logic for the voice web application, the application state document being an XML data record specifying application state and user attribute information for the voice web application during a user session, the application state document being stored in a registry during execution of the voice web application;
   and further comprising:
      an XML parser configured for parsing the XML documents; and
      a runtime environment for execution of the XML documents based on the parsing by the XML parser, such execution including selective execution of a user interface operation, a logic operation, and a procedure call as specified by a parsed XML document.

13. The processor-based server system of claim 12, wherein the application runtime environment includes a tag implementation module operative to implement XML tags parsed by the XML parser by performing a selected one of (dynamically generating an XML menu page in response to detecting a menu tag, performing a logical operation in response to a decision tag, fetching an audio file in response to detecting a sound tag).

14. The processor-based server system of claim 12 further comprising a set of libraries enabling the application runtime environment to implement procedures specified by the XML documents by issuing function calls to one of a plurality of Internet Protocol (IP)-compliant remote resources.

15. The processor-based server system of claim 14, wherein the function calls are issued according to a protocol selected from Internet Message Access Protocol, Lightweight Directory Access Protocol, and Simple Mail Transfer Protocol.

16. A method in an application server, the steps comprising:
   the application server receiving a first request from a proxy browser over a network for a response for a subscriber;
   the application server accessing profile information for the subscriber from a database;
   the application server generating a response document having content tags that specify media content and control tags that define playback of the response for the subscriber via a limited communications device in an audible form;
   receiving a second request from the proxy browser over the network including at least one key chunk generated based on a speech command provided by the subscriber based on the response document; and
   the application server initiating a call service based on interpretation of the at least one key chunk relative to the profile information and the response;
   wherein:

the step of receiving a first request comprises receiving a first hypertext transfer protocol (HTTP) request;

the step of accessing profile information comprises accessing profile information from the database based on Internet Protocol (IP);

the step of generating a response document comprises generating a hypertext markup language (HTML) document having extensible markup language (XML) tags;

the step of receiving the second request comprises receiving a second HTTP request; and the response document further includes (i) plugin control tags identifying control data to be used to control operation of a plug-in resource, (ii) prompt list tags identifying, as a first part of the control data, an ordered list of prompts, (iii) prompt tags identifying individual ones of the prompts in the ordered list, each prompt identified as a corresponding audio file, (iv) user input tags identifying, as a second part of the control data, user input data to be received as user, (v) a hotkey pattern value tag identifying hotkey pattern values as the user input data, and at least one of (vi) expected input patterns including key chunks, (vii) time-out length, (viii) time-out action, and (ix) an indication whether a recording operation is required.

17. The method of claim 16, wherein the step of initiating a call service comprises initiating an outgoing call to a destination based on interpretation of the at least one key chunk relative to the profile information and the first response.

* * * * *